United States Patent [19]
Luca

[11] Patent Number: 5,148,949
[45] Date of Patent: Sep. 22, 1992

[54] DETACHABLE DISPENSER FOR DISTRIBUTING SCENT OR LURE

[76] Inventor: Frank Luca, 54 Green St., New York, N.Y. 10013

[21] Appl. No.: 694,836

[22] Filed: May 2, 1991

[51] Int. Cl.⁵ .............................................. B67D 5/64
[52] U.S. Cl. ..................................... 222/175; 36/136; 43/1; 222/181; 222/186; 222/212; 224/148; 224/222; 239/153; 239/327
[58] Field of Search ............... 222/175, 181, 186, 206, 222/212, 556; 43/1; 239/152, 153, 154, 327; 36/1, 132, 136; 224/148, 222

[56] References Cited
U.S. PATENT DOCUMENTS

| | | | |
|---|---|---|---|
| 3,306,499 | 2/1967 | Lykes | 222/212 X |
| 4,186,502 | 2/1980 | Foster | 36/136 |
| 4,410,118 | 10/1983 | Taurisano | 224/222 |
| 4,463,879 | 8/1984 | Des Voignes | 222/175 |
| 4,674,661 | 6/1987 | Herold | 222/556 X |
| 4,682,715 | 7/1987 | Reeves | 222/175 |
| 4,722,477 | 2/1988 | Floyd | 239/53 X |
| 5,024,008 | 6/1991 | Maples | 36/136 |

FOREIGN PATENT DOCUMENTS

| | | | |
|---|---|---|---|
| 994781 | 6/1965 | United Kingdom | 222/181 |
| 2139103 | 11/1984 | United Kingdom | 36/132 |

*Primary Examiner*—Andres Kashinikow
*Assistant Examiner*—Joseph A. Kaufman
*Attorney, Agent, or Firm*—Steven H. Bazerman

[57] ABSTRACT

A scent dispensing system for use by hunter's or the like when a flexible bottle of scent, with a small aperture at the bottle's bottom is placed in a special holster which attaches to the hunter's foot at the ankle whereby liquid scent is forced out a drop at a time as the hunter walks to his or her hunting post. Pressure created by the action of the foot hitting the ground coupled with the pressure created by the expansion of the leg muscle and movement of the hunter's ankle as the hunter walks forces the scent to drip out a drop or two at a time. The holster has a pouch for holding the bottle made of a flexible material which is attached by a strap of elastic material. The ends of the strap are attached around the leg of the hunter by a conventional fastener. A wedge of rigid material is positioned in the pouch behind the bottle to assure that the scent will hit the ground and not the hunter or his boots.

3 Claims, 2 Drawing Sheets

DETACHABLE DISPENSER FOR DISTRIBUTING SCENT OR LURE

FIELD OF THE INVENTION

The present invention relates to a liquid scent dispenser for use by hunters and the like which straps around a hunter's lower leg at the ankle to dispense a small amount of masking scent alongside the hunter's foot as the hunter moves.

DESCRIPTION OF THE PRIOR ART

In general, game animals are sensitive to the odor of humans. Accordingly, hunters and others who wish to position themselves close to animals, need to disguise their scent. Liquid concentrates of various scents are often employed to camouflage the scent of a hunter. Typically, scents that are used to mask human odor are ones common to the environment of the game animal. Such scents include pheromones or musk of the hunted animal, pine, cedar, white oak, acorn apple or urine from the same or other co-inhabitant animals of the area. Scents such as pheromones may also act to lure animals to the vicinity of the hunter.

Over the years various methods have been developed to dispense such covering scent. For example, liquid concentrates of the scent may be applied to the clothing or shoes of a hunter. Since the scents, by definition, have strong odors, the scent permeates the hunter's clothing. Commonly the clothing retains unpleasant odors long after the hunting season and thus is not a preferable method of spreading scent. It also stains the hunter's clothing.

Merely spreading the liquid scent by hand in the hunting area is highly inefficient and wasteful. Since liquid covering scent is relatively expensive, the random spreading of scent in the area becomes unduly costly.

Hand held dispensing devices such as disclosed in U.S. Pat. No. 4,771,563 to Easley, issued on Sept. 20, 1988, have also been used to provide a covering scent. Such dispensers are unwieldy and restrict the hunter's freedom of movement. The awkwardness arising from hand carrying the device, limits the hunter's ability to carry or use other devices such as a rifle or camera. Also, in order for it to work properly the hunter must be concerned about where he positions the dispenser because of constantly changing wind conditions. Equally the hunter must remember to take the dispenser with him each time he moves.

Various devices have been developed to dispense scent while leaving the hunter's hands free. For example, U.S. Pat. No. 4,506,806 to Lincoln, issued on Mar. 26, 1985, discloses a device where a liquid scent reservoir is strapped to the hunter's belt and a long flow line leads from the reservoir on the hunter's belt through a flow regulator to the ground. Obviously, the use of such a long flow line presents hazards to the hunter when moving through a forest, including possible entanglement in bushes and trees, possible creation of noises which may alert the animal and in general, interference with the hunter's movements. Since the hunter must be constantly concerned about the movement of the hose, i.e., to prevent it getting tangled or caught, it is difficult for him to maintain his concentration on looking for game. Such a device is also awkward appearing which may cause hunters to refrain from using it.

Recognizing these problems, various devices have been developed for dispensing scent directly to the ground by a device attached to a hunter's boot or shoe. For example, U.S. Pat. No. 4,722,477 to Floyd, issued Feb. 2, 1988; U.S. Pat. No. 4,735,010 issued to Grinarml on Apr. 5, 1988 and U.S. Pat. No. 4,186,502 issued to Foster on Feb. 5, 1980, all disclose strips of scent, attached onto or in the bottoms or sides of boots for dispensing scent. Such systems have inherent problems inasfar as the amount of scent held by such devices is quite small and thus provides a limited range of protected movement. Scent must be reapplied almost continually to the dispenser for it to be effective. In rough terrain it is difficult to maintain the dispenser in position and it may come off the boot while walking.

U.S. Pat. No. 4,682,715 to Reeves dated Jul. 28, 1987 discloses the use of a large reservoir of scent attached to the heel of a shoe which gradually disperses the fluid scent into an elongated, flexible, absorbent applicator which is dragged along the ground during the hunter's movement. As with the other devices which require the use of a device trailing the ground, problems arise from entanglement, inconvenience and noise generation.

SUMMARY OF THE INVENTION

The principal object of this invention is to provide an apparatus for dispensing scent from a large reservoir strapped to the hunter's ankle which applies minute amount of scent alongside the hunter's foot at each step of the hunter.

By placing a flexible dispensing bottle of scent (such as fox urine, acorn, apple, etc.), with a small aperture at the bottle's bottom in a special holster which attaches to the hunter's boot at the ankle, liquid scent is forced out a drop at a time as the hunter walks to his or her hunting post. As a result a trail of scent more potent than his or her own is laid down alongside his or her foot at each step. The dispensing bottle has a screw off cap with a hinged dispensing nozzle, the nozzle having a small orifice (approximately 0.8 mm) to allow drops of scent to be forced out of the bottle. With the hinged nozzle in the closed position, no flow of scent would occur. Even when the hinged nozzle is in the open position, scent will not flow from the container unless forced. The pressure created by the action of the foot hitting the ground coupled with the pressure created by the expansion of the leg muscles and movement of the hunter's ankle as the hunter walks, forces the scent to drip out one or two drops at a time.

The holster has a pouch for holding the flexible dispensing bottle made of vinyl fabric to which is attached a strap of elastic material to hold the bottle. The vinyl acts to insulate the bottle to protect it from freezing. The straps are attached to each other around the leg of the hunter by any conventional fastener. A wedge made from a light rigid material such as Styrofoam is positioned at the back of the pouch to allow the dispensing nozzle to be positioned off the boot to ensure that the scent will fall to the ground and not on the boot itself.

DESCRIPTION OF THE DRAWINGS

The foregoing as well other objects of the present invention will be more apparent from the following detailed description of the preferred embodiment of the invention, when taken together with the accompanying drawings, in which.

DETAILED DESCRIPTION

Figure 1:
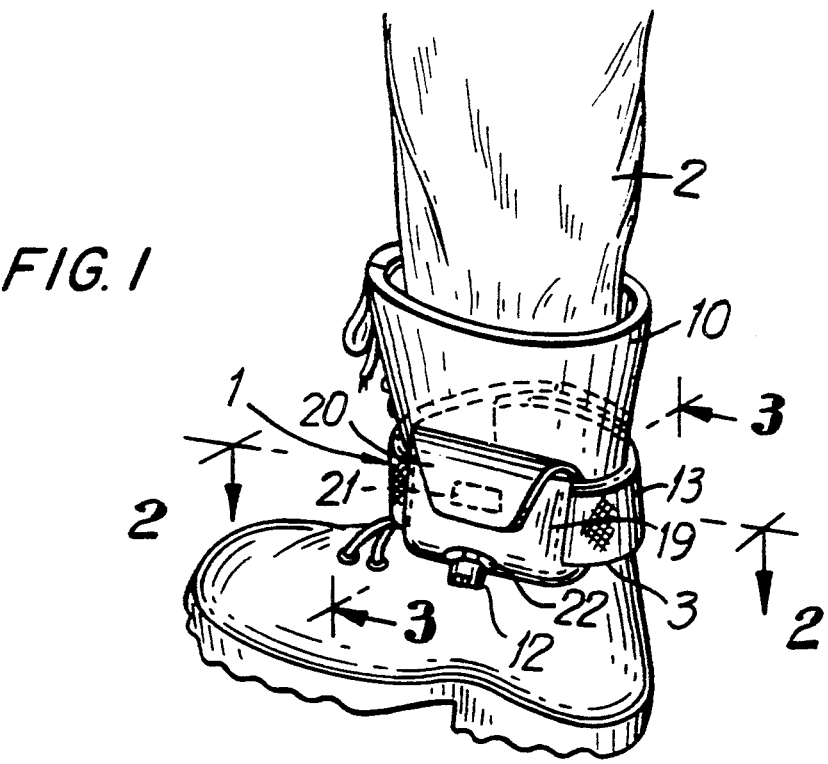
FIG. 1 is a prospective view of liquid scent dispenser in accordance with the present invention mounted on a hunter's boot.
Figure 2:
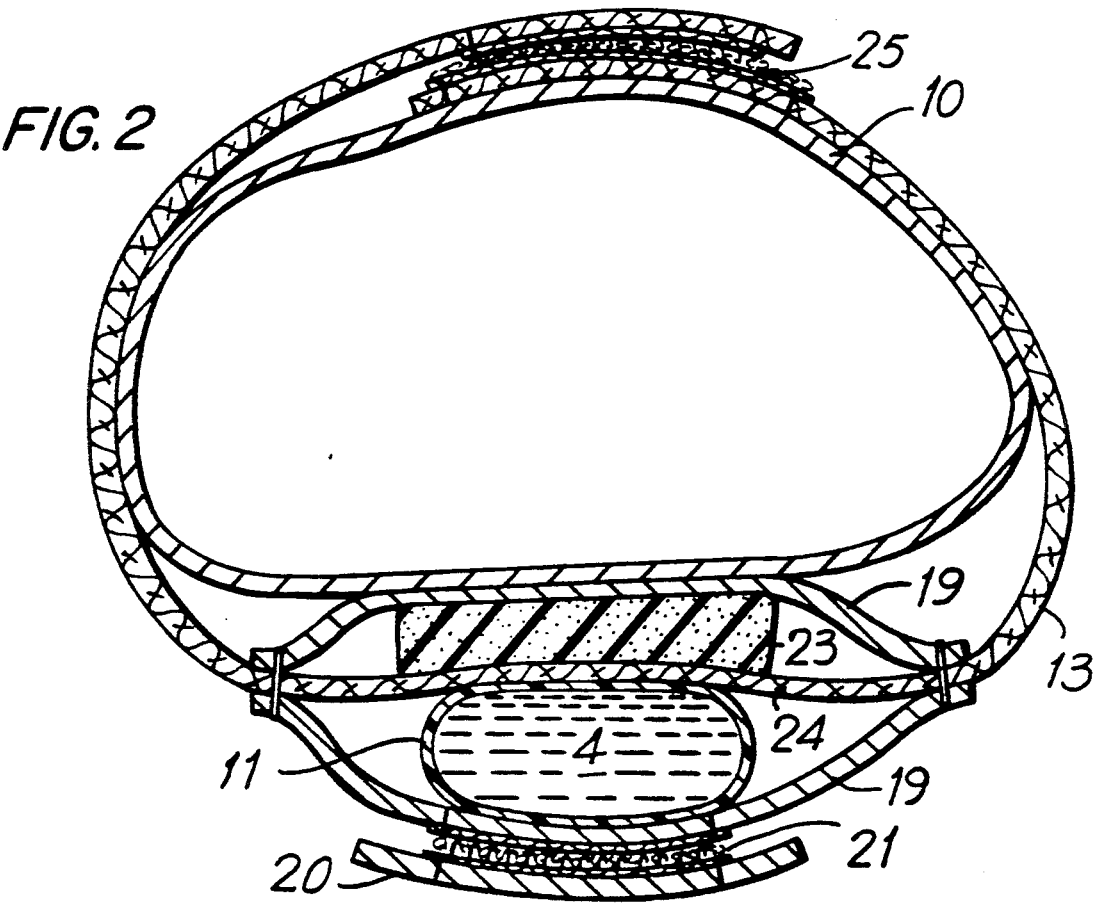
FIG. 2 is a partial cross sectional view of the scent dispenser of the present invention mounted on the boot taken along plane 2—2 of FIG. 1.
Figure 3:
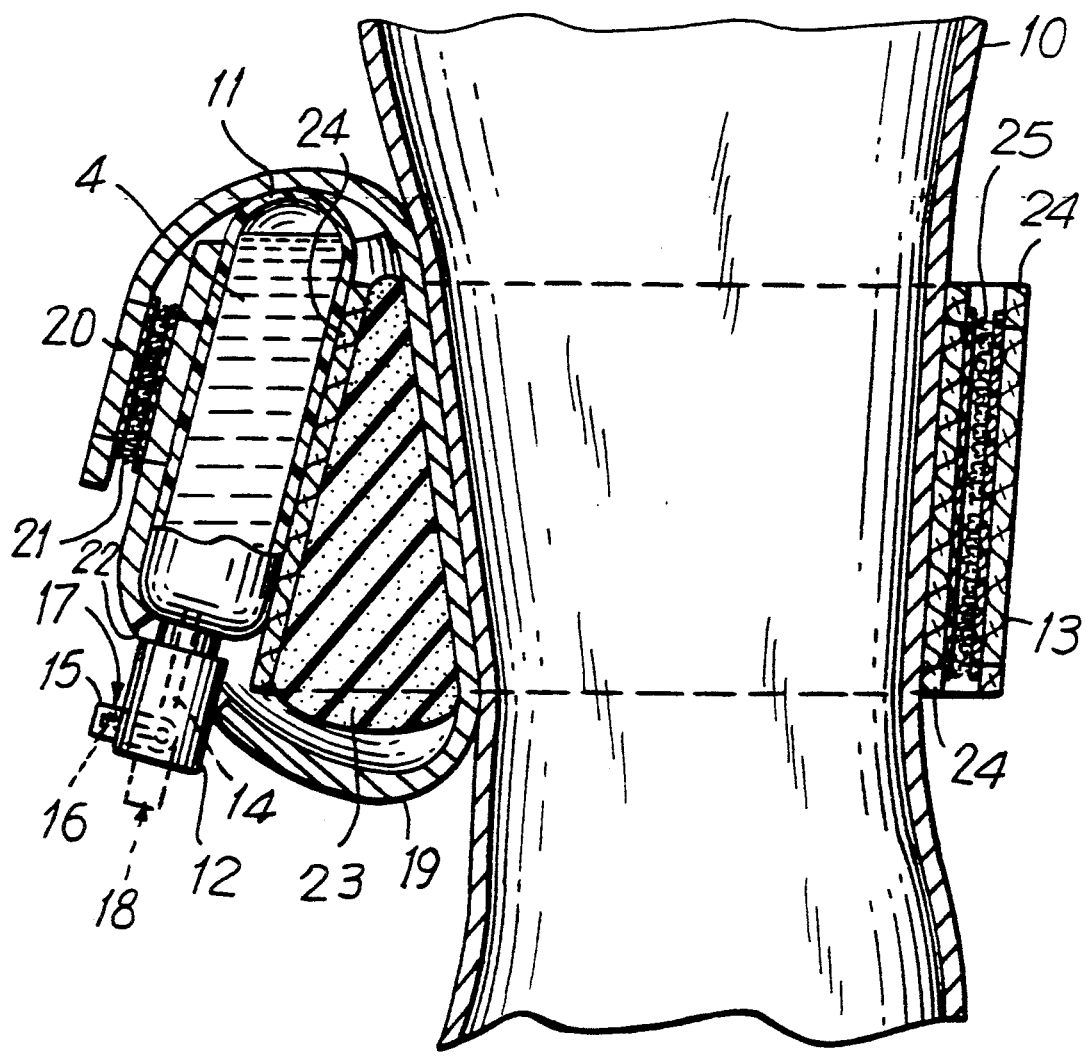
FIG. 3 is a partial cross sectional view of the scent dispenser taken along plane 3—3 of FIG. 1 with the dispensing bottle shown in elevation.

FIG. 1 shows the present invention mounted on a typical boot 10 worn by a hunter 2. A bottle 11 having a dispensing cap 12 is mounted on the boot at the ankle 3 of the hunter 2 by holster 13. The bottle 11 is formed from a flexible material such as plastic. The cap 12 has a passage 14 therein. A rotatable nozzle 15 is mounted on cap 12. It has an internal passage 16. When nozzle 15 is in a first or closed position 17, one end of cap 14 abuts a side wall of the nozzle 15 which acts to close passage 14. The nozzle 15 can be rotated to position 18. With the nozzle position in position 18, passageway 16 in nozzle 15 is aligned with passage 14 in cap 12 allowing liquid scent 4 to pass from the body of the bottle through passage 14 and 16. Since the bottle 11 is sealed except for the passages 14 and 16, no liquid scent 4 will flow from the bottle unless pressure is applied to the liquid scent in bottle 11.

The bottle 11 is mounted in a pouch 19 of holster 13. The pouch 19 would be made from a strong insulating material such as Vinyl or Vinyl impregnated fabric both to protect the bottle 11 and to insulate the bottle 11 from the ambiant temperature. The pouch 19 has a top 20 which is held in place by a fabric fastener 21. Pouch 19 has a hole 22 through which cap 12 is positioned. Also positioned in pouch 19 is a rigid wedge 23 made from a light rigid material such as Styrofoam. Passing through pouch 19 between wedge 23 and bottle 11 is elastic strap 24 for holding the pouch rigidly against boot 10. Elastic strap 24 has its ends held in position by fabric fastener 25, positioned on the opposite side of the boot 10. The holster 13 is positioned so that pouch 19 is on the outer side of the boot 10 at approximately ankle height. In operation a bottle of appropriate scent 11 is positioned in pouch 19 which is then tightly positioned around the wearer's boot, the cap nozzle 15 being in the closed position 17 during mounting of the holster 13.

When it is desired to cover the scent of the hunter the nozzle 15 is moved to position 18. The bottle 11 is a closed system which is only vented to the atmosphere through passageway 16 and 14 when the nozzle 15 is in the open position 18, and thus liquid will not flow from the bottle 11 unless pressure is applied to the contents of bottle 11. In the present arrangement, every time the hunter takes a step, the movement of the hunter's leg muscles and his ankle combined with the jarring effect of the hunter's step itself, acts to release a drop or two of the scent. For a given diameter of passage 16, the tighter that the flexible strap 24 is attached around the boot 13 the greater the flow of liquid at each step. Equally the size of the aperture 16 controls the amount of liquid released at each step. It has been found for hunting situations, a nozzle opening of approximately 0.8 mm in diameter provides a sufficient flow of scent to cover a hunter's odor when used with most commercial scents. For different scents and game, larger or smaller orifices may be necessary to properly dispense the liquid scent. The wedge 23 acts to angle the nozzle 15 away from the side of the boot 10 so that the scent 4 falls to the ground rather than on to the boot 10 itself.

In use the hunter 2 would position nozzle 15 in the open position at the point he wished the scent to be covered and proceed to his hunting station. After he had settled in his hunting station, the nozzle 15 could be moved to the closed position to conserve the liquid 4. Using the holster with a scent bottle 11 having a 0.8 mm opening, sufficient scent is contained in a 1¼ ounce bottle to cover three quarters of a mile. It is believed that the average hunter walks about ¼ of a mile to position himself.

In addition to being used by hunters for masking human odors the scent dispensing device of the present invention could be used by wildlife photographers, naturalists or the like. Equally if a lure scent or used in a dispensing device, the desired animal can be lured to the vicinity of the hunter or naturalist.

While a preferred embodiment of invention has been described using specific terms, such description is for illustration purposes only, and it to be understood that changes and variations may be made without departing from the spirit or scope of the following claims:

I claim:

1. A liquid scent dispenser for attachment to a article of footwear at or about the ankle region, comprising:
   a flexible container having a nozzle attached at one end for housing the desired liquid scent to be dispensed;
   a flexible pouch in which said container is mounted, said flexible pouch having a hole in the lower end in which the nozzle of said container is positioned;
   an elastic strap attached to said pouch;
   cooperating fastening members attached to each end of the elastic strap to allow attachment of said pouch around the article of footwear at a desired tension; and
   said flexible container, elastic strap and fastening members arranged and being so constructed so that when said dispenser is mounted on an article of footwear, movement of said footwear causes a variable tension to be applied to the flexible pouch and thereby to the container mounted whereby pressure created by the movement of said footwear itself coupled with said change of tension on the flexible container by said movement forces the liquid out of the container one drop at a time and absent such movement, liquid is not forced out of the container.

2. A liquid scent dispensing device in accordance with claim 1 wherein the nozzle has an open position which allows fluid to drip from the flexible container and a closed position wherein the liquid scent is retained in the bottle.

3. A liquid scent dispensing device in accordance with claim 1 wherein inside said pouch is a wedge which positions said flexible container and the nozzle so the liquid leaving the nozzle will be spaced from the footwear on which the flexible container is mounted.

* * * * *